(12) United States Patent
Ozluturk et al.

(10) Patent No.: US 8,369,385 B2
(45) Date of Patent: Feb. 5, 2013

(54) CANCELLATION OF PILOT AND TRAFFIC SIGNALS

(75) Inventors: Fatih M Ozluturk, Port Washington, NY (US); Nadir Sezgin, Brooklyn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 406 days.

(21) Appl. No.: 12/823,407

(22) Filed: Jun. 25, 2010

(65) Prior Publication Data

US 2010/0260238 A1    Oct. 14, 2010

Related U.S. Application Data

(63) Continuation of application No. 11/234,768, filed on Sep. 23, 2005, now Pat. No. 7,751,465, which is a continuation of application No. 10/462,489, filed on Jun. 16, 2003, now Pat. No. 6,950,411, which is a continuation of application No. 10/266,408, filed on Oct. 8, 2002, now Pat. No. 6,603,743, which is a continuation of application No. 09/175,174, filed on Oct. 20, 1998, now Pat. No. 6,498,784.

(51) Int. Cl.
    *H04B 1/68*    (2006.01)
(52) U.S. Cl. ........................ 375/148; 375/150
(58) Field of Classification Search .................. 375/130, 375/140, 141, 142, 144, 147, 148, 150; 370/335, 370/342, 441
    See application file for complete search history.

(56) References Cited

U.S. PATENT DOCUMENTS

| | | | |
|---|---|---|---|
| 5,224,122 A | 6/1993 | Bruckert | |
| 5,235,612 A | 8/1993 | Stilwell et al. | |
| 5,418,814 A | 5/1995 | Hulbert | |
| 5,465,413 A | 11/1995 | Enge et al. | |
| 5,646,964 A | 7/1997 | Ushirokawa et al. | |
| 5,719,852 A | 2/1998 | Schilling et al. | |
| 5,740,208 A * | 4/1998 | Hulbert et al. | 375/346 |
| 5,745,485 A | 4/1998 | Abramson | |
| 5,812,673 A | 9/1998 | Nohara et al. | |
| 6,034,986 A | 3/2000 | Yellin | |
| 6,067,292 A | 5/2000 | Huang et al. | |
| 6,067,333 A | 5/2000 | Kim et al. | |
| 6,118,806 A | 9/2000 | Niida et al. | |
| 6,125,137 A | 9/2000 | Wang et al. | |
| 6,154,443 A | 11/2000 | Huang et al. | |
| 6,192,067 B1 | 2/2001 | Toda et al. | |
| 6,240,099 B1 | 5/2001 | Lim et al. | |
| 6,252,899 B1 | 6/2001 | Zhou et al. | |
| 6,333,947 B1 | 12/2001 | van Heeswyk et al. | |
| 6,366,607 B1 * | 4/2002 | Ozluturk et al. | 375/152 |
| 6,404,760 B1 | 6/2002 | Holtzman et al. | |
| 6,498,784 B1 | 12/2002 | Ozluturk | |
| 6,553,058 B1 | 4/2003 | Naito | |
| 6,584,115 B1 | 6/2003 | Suzuki | |
| 6,603,743 B2 | 8/2003 | Ozluturk et al. | |
| 6,628,701 B2 | 9/2003 | Yellin | |
| 6,667,964 B1 | 12/2003 | Seki et al. | |

(Continued)

FOREIGN PATENT DOCUMENTS

| | | |
|---|---|---|
| CA | 2 228 204 | 7/1998 |
| EP | 0 717 505 | 6/1996 |

(Continued)

*Primary Examiner* — Tesfaldet Bocure
(74) *Attorney, Agent, or Firm* — Volpe and Koenig, P.C.

(57) ABSTRACT

A method for removing selected signals from a received signal prior to decoding begins by receiving communication signals from a transmitter over a CDMA air interface. The received communication signals are input to a traffic signal cancellation system for canceling unwanted traffic signals, thereby producing an output (O). The received communication signals are input to a pilot signal cancellation system for removing a global pilot signal, thereby producing an output ($O_{add}$). The output ($O_{add}$) of the pilot signal cancellation system is subtracted from the output (O) of the traffic signal cancellation system to provide a cancellation system output.

12 Claims, 8 Drawing Sheets

U.S. PATENT DOCUMENTS

| | | |
|---|---|---|
| 6,680,928 B1 | 1/2004 | Dent |
| 6,741,634 B1 | 5/2004 | Kim et al. |
| 6,751,264 B2 | 6/2004 | Ho et al. |
| 6,768,727 B1 | 7/2004 | Sourour et al. |
| 6,782,040 B2 | 8/2004 | Mesecher et al. |
| 6,819,720 B1 | 11/2004 | Willetts |
| 6,834,043 B1 | 12/2004 | Vook et al. |
| 6,925,071 B2 | 8/2005 | Schilling |
| 6,950,411 B2 | 9/2005 | Ozluturk et al. |
| 7,020,114 B2 | 3/2006 | Schilling |
| 7,050,481 B1 | 5/2006 | Hulbert |
| 7,099,292 B2 | 8/2006 | Schilling |
| 7,133,353 B2 | 11/2006 | Sourour et al. |
| 7,149,200 B1 | 12/2006 | Vadgama |

FOREIGN PATENT DOCUMENTS

| | | |
|---|---|---|
| EP | 0 823 796 | 2/1998 |
| JP | 07-250008 | 9/1995 |
| JP | 08-079130 | 3/1996 |
| WO | 98/43362 | 10/1998 |

\* cited by examiner

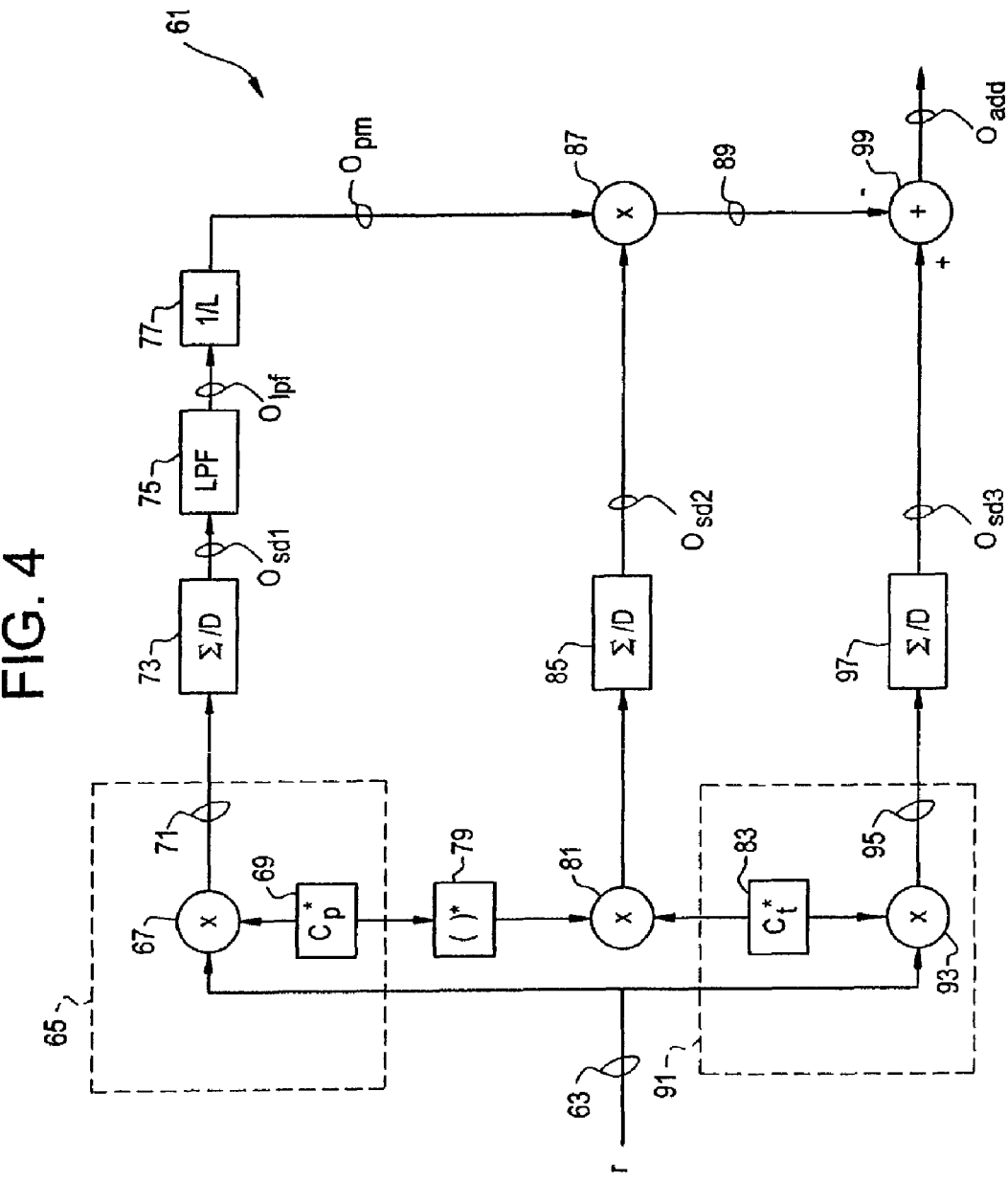

CANCELLATION OF PILOT AND TRAFFIC SIGNALS

CROSS REFERENCE TO RELATED APPLICATION

This application is a continuation of U.S. patent application Ser. No. 11/234,768, filed on Sep. 23, 2005, which is a continuation of U.S. patent application Ser. No. 10/462,489, filed Jun. 16, 2003, now U.S. Pat. No. 6,950,411, which is a continuation of Ser. No. 10/266,408, filed Oct. 8, 2002, now U.S. Pat. No. 6,603,743, which is a continuation of U.S. patent application Ser. No. 09/175,174, filed Oct. 20, 1998, now U.S. Pat. No. 6,498,784, which are incorporated by reference as if fully set forth herein.

BACKGROUND OF THE INVENTION

The present invention relates generally to digital communications. More specifically, the invention relates to a system and method which cancels the global pilot signal and unwanted traffic signals from a received code division multiple access signal thereby removing them as interferers prior to decoding.

DESCRIPTION OF THE PRIOR ART

Advanced communication technology today makes use of a communication technique in which data is transmitted with a broadened band by modulating the data to be transmitted with a pseudo-noise (pn) signal. The technology is known as digital spread spectrum or code division multiple access (CDMA). By transmitting a signal with a bandwidth much greater than the signal bandwidth, CDMA can transmit data without being affected by signal distortion or an interfering frequency in the transmission path.

Shown in FIG. 1 is a simplified, single channel CDMA communication system. A data signal with a given bandwidth is mixed with a spreading code generated by a pn sequence generator producing a digital spread spectrum signal. The signal which carries data for a specific channel is known as a traffic signal. Upon reception, the data is reproduced after correlation with the same pn sequence used to transmit the data. Every other signal within the transmission bandwidth appears as noise to the signal being despread.

For timing synchronization with a receiver, an unmodulated traffic signal known as a pilot signal is required for every transmitter. The pilot signal allows respective receivers to synchronize with a given transmitter, allowing despreading of a traffic signal at the receiver.

In a typical communication system, a base station communicates with a plurality of individual subscribers fixed or mobile. The base station which transmits many signals, transmits a global pilot signal common to the plurality of users serviced by that particular base station at a higher power level. The global pilot is used for the initial acquisition of an individual user and for the user to obtain signal-estimates for coherent reception and for the combining of multipath components during reception. Similarly, in a reverse direction, each subscriber transmits a unique assigned pilot for communicating with the base station.

Only by having a matching pn sequence can a signal be decoded, however, all signals act as noise and interference. The global pilot and traffic signals are noise to a traffic signal being despread. If the global pilot and all unwanted traffic signals could be removed prior to despreading a desired signal, much of the overall noise would be reduced, decreasing the bit error rate and in turn, improving the signal-to-noise ratio (SNR) of the despread signal.

Some attempts have been made to subtract the pilot signal from the received signal based on the relative strength of the pilot signal at the receiver. However, the strength value is not an accurate characteristic for calculating interference due to the plurality of received signals with different time delays caused by reflections due to terrain. Multipath propagation makes power level estimates unreliable.

There is a need to improve overall system performance by removing multiple noise contributors from a signal prior to decoding.

SUMMARY OF THE INVENTION

A mobile user receiver having a cancellation system for removing selected signals from a traffic signal prior to decoding includes a receiver having a system input for receiving communication signals from a transmitter over an air interface. The system input is supplied to a traffic signal cancellation system for canceling unwanted traffic signals. The system input is also supplied to a pilot signal cancellation system for removing a global pilot signal. The output of the pilot signal cancellation system is subtracted from the output of the traffic signal cancellation system to provide a cancellation system output free from unwanted traffic signals and the global pilot signal.

A method for removing selected signals from a received signal prior to decoding begins by receiving communication signals from a transmitter over a CDMA air interface. The received communication signals are input to a traffic signal cancellation system for canceling unwanted traffic signals, thereby producing an output (O). The received communication signals are input to a pilot signal cancellation system for removing a global pilot signal, thereby producing an output ($O_{add}$). The output ($O_{add}$) of the pilot signal cancellation system is subtracted from the output (O) of the traffic signal cancellation system to provide a cancellation system output.

A method for removing a global pilot code from a received signal begins by despreading a global pilot code from a received signal. The strength of the global pilot code is determined. The global pilot code is cross-correlated with a conjugate of a desired traffic code. The desired traffic code is despread from the received signal. The product of the strength of the global pilot code and the cross-correlation result is subtracted from the despread desired traffic code.

A method for removing an unwanted traffic signal from a received signal begins by despreading a desired traffic code from the received signal. At least one unwanted traffic code is despread from the received signal. The strength of the unwanted traffic code is determined and the unwanted traffic data is determined from the despread unwanted traffic code. The strength of the unwanted traffic code and the unwanted traffic data are multiplied. A conjugate of the desired traffic code and the unwanted traffic code are cross-correlated. The result of the cross-correlation of a conjugate of the desired traffic code and the unwanted traffic code is amplified according to the result of the multiplication of the strength of the unwanted traffic code and the unwanted traffic data. The result of the amplification is subtracted from the despread desired traffic code.

A receiver having a system for canceling a pilot code from a received signal includes a global pilot code despreader for despreading a global pilot code from a received signal; means for generating a global pilot code strength from the despread global pilot code; means for generating a cross-correlation of a conjugate of a desired traffic code and the global pilot code;

a mixer for mixing a global pilot code strength and the output of the cross-correlation of the conjugate of the desired traffic code and the global pilot code; a desired traffic code despreader for despreading a desired traffic code from the received signal; and a summer for summing the output of the mixer and the output of the desired traffic code despreader.

A receiver having a system for removing unwanted traffic signals from a received signal prior to decoding includes a desired traffic code despreader for despreading a desired traffic code from a received signal; at least one unwanted traffic code canceller; and a summer for summing the despread desired traffic code and the output of unwanted traffic code canceller. Each unwanted traffic code canceller includes an unwanted traffic code despreader for despreading an unwanted traffic code from the received signal; means for generating an unwanted traffic code strength from the despread unwanted traffic code and for determining unwanted traffic data; a multiplier for multiplying the unwanted traffic data and the unwanted traffic code strength; a cross-correlator for cross-correlation of a conjugate of a desired traffic code and the unwanted traffic code; and a variable amplifier for amplifying the result of cross-correlation of a conjugate of a desired traffic code and the unwanted traffic code according to the result of the multiplication of the unwanted traffic data and the unwanted traffic code strength.

A receiver having a means for canceling selected signals from a received signal over a CDMA air interface includes an unwanted signal canceller for subtracting an unwanted traffic signal from a received signal and a pilot signal canceller for subtracting a pilot signal from a received signal.

The present invention reduces the contributive noise effects of the global pilot signal and unwanted traffic signals transmitted in a spread spectrum communication system. The present invention effectively cancels the global pilot and unwanted traffic signal(s) from a desired traffic signal at a receiver prior to decoding. The resulting signal has an increased signal-to-noise ratio.

Accordingly, it is an object of the present invention to provide a code division multiple access communication system receiver which reduces the contributive noise effects from the pilot and active, unwanted traffic signals.

It is another object of the present invention to improve the desired traffic signal SNR by eliminating the noise effects of the global pilot and active traffic signals.

Other objects and advantages of the system and method will become apparent to those skilled in the art of advanced telecommunications after reading the detailed description of the preferred embodiment.

BRIEF DESCRIPTION OF THE DRAWINGS

FIG. 4 is a block diagram of a global pilot signal cancellation system according to the present invention.

DESCRIPTION OF THE PREFERRED EMBODIMENTS

Figure 1:
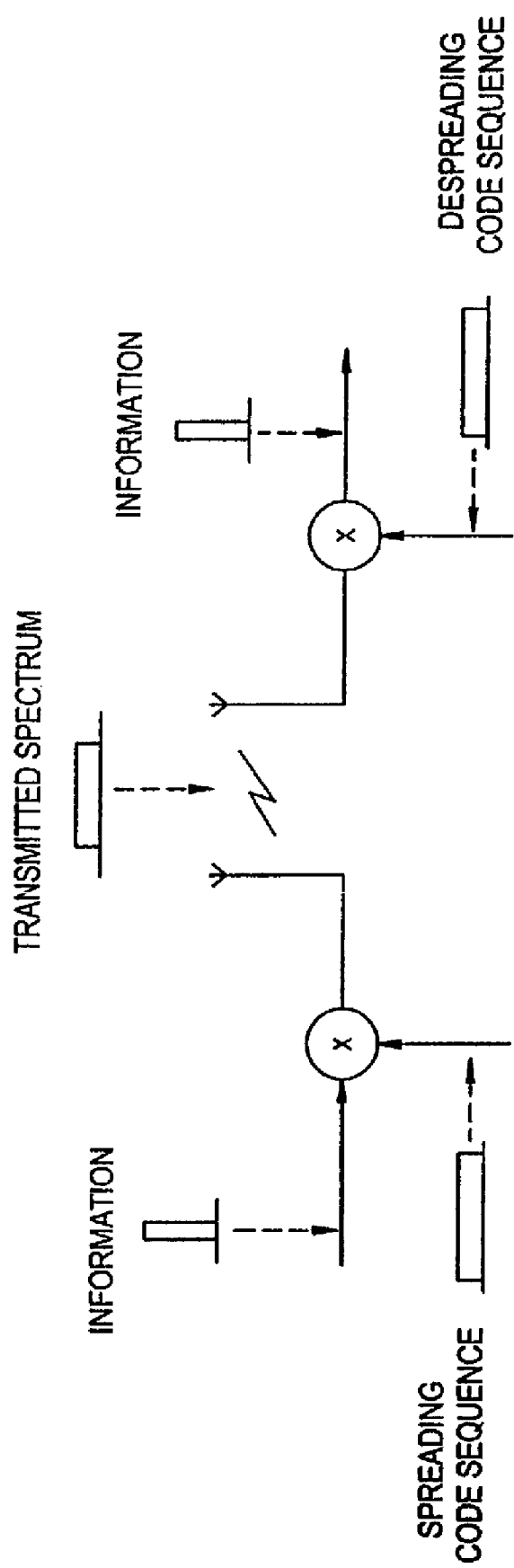
FIG. 1 is a simplified block diagram of a prior art, CDMA communication system.

The preferred embodiments will be described with reference to the drawing figures where like numerals represent like elements throughout.

Figure 2A:
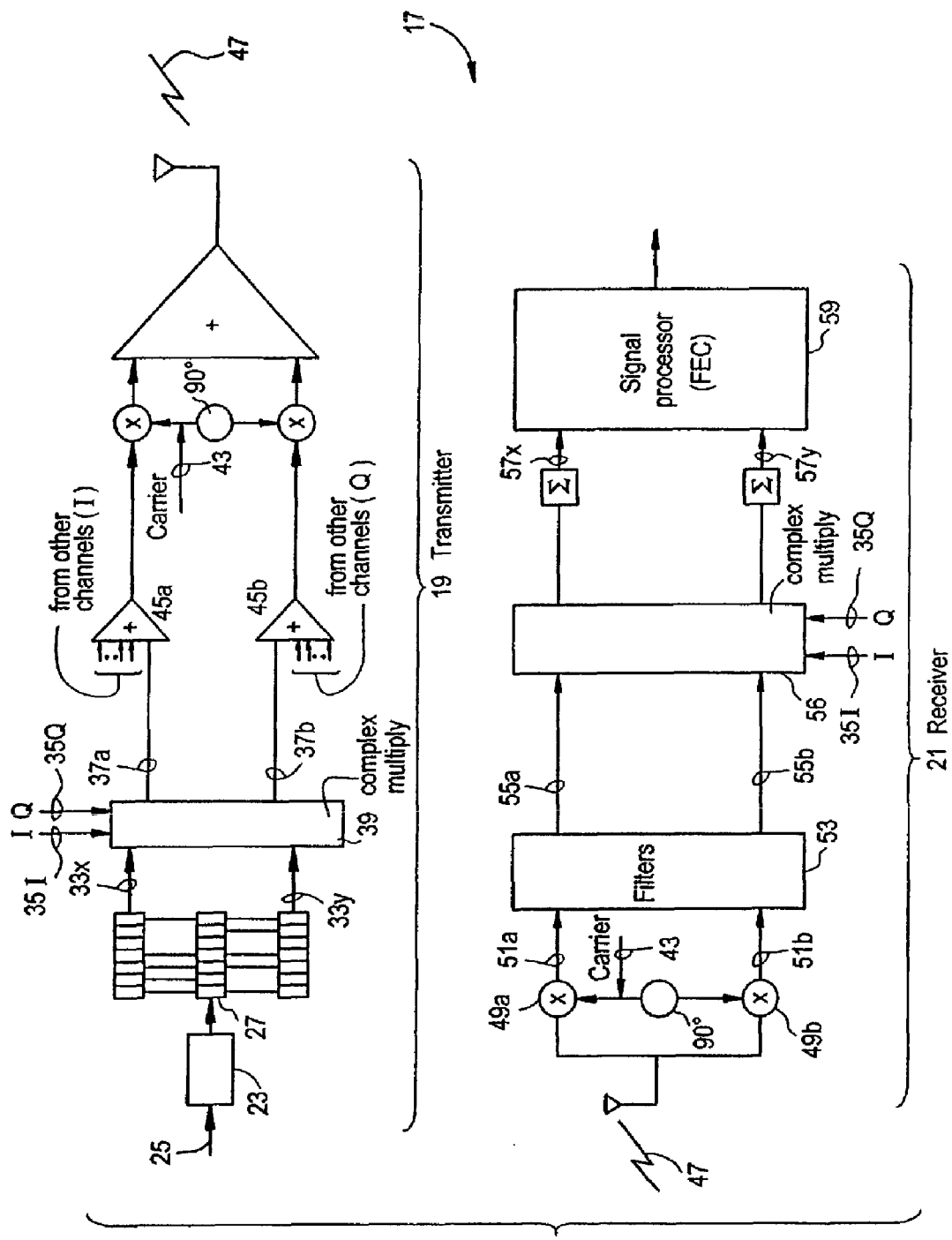
FIG. 2A is a detailed block diagram of a B-CDMA™ communication system.

A B-CDMA™ communication system 17 as shown in FIG. 2 includes a transmitter 19 and a receiver 21, which may reside in either a base station or a mobile user receiver. The transmitter 19 includes a signal processor 23 which encodes voice and nonvoice signals 25 into data at various bit rates.

By way of background, two steps are involved in the generation of a transmitted signal in a multiple access environment. First, the input data which can be considered a bi-phase modulated signal is encoded using forward error-correcting coding (FEC) 27. One signal is designated the in-phase channel I 33x. The other signal is designated the quadrature channel Q 33y. Bi-phase modulated I and Q signals are usually referred to as quadrature phase shift keying (QPSK).

Figure 2B:
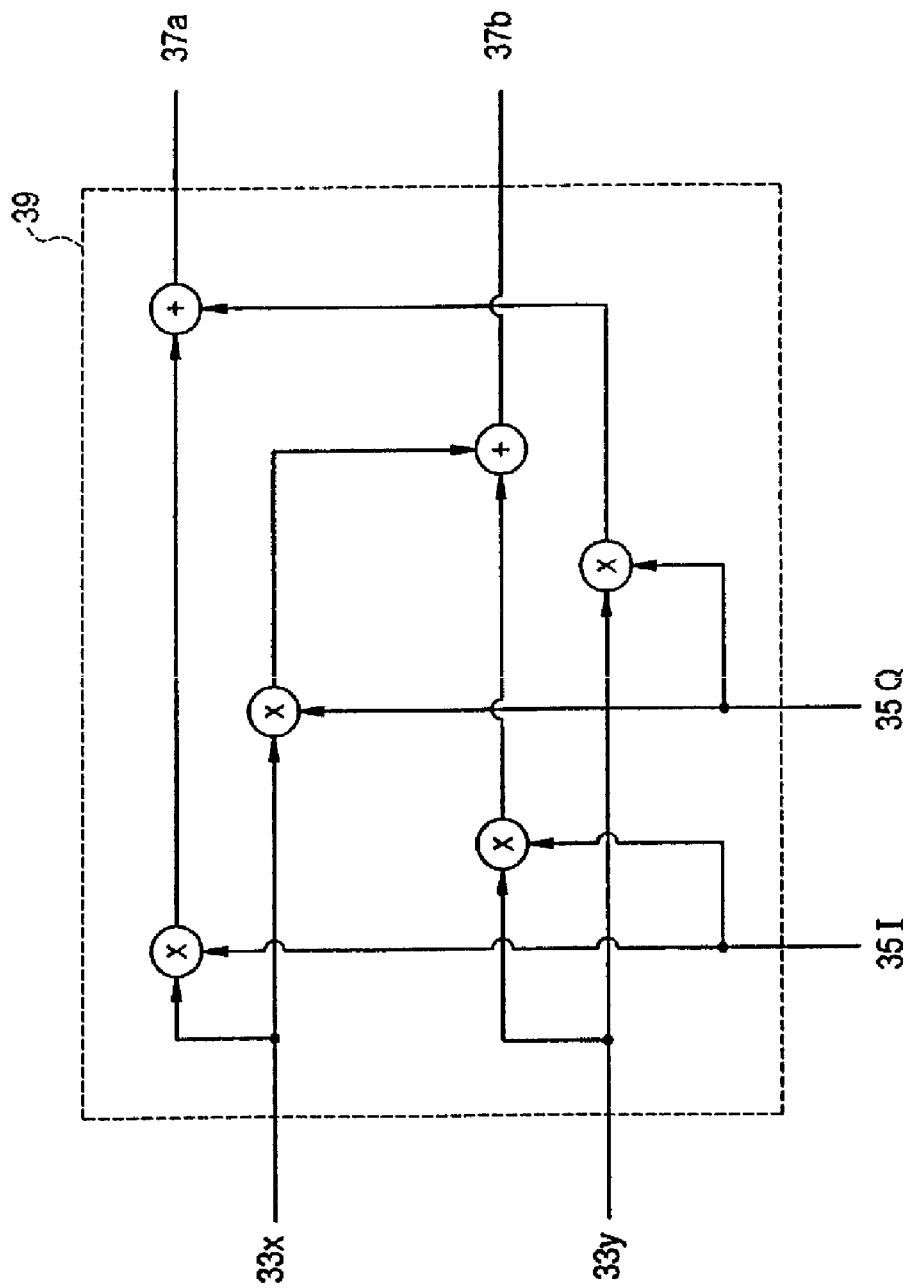
FIG. 2B is a detailed system diagram of a complex number multiplier.

In the second step, the two bi-phase modulated data or symbols 33x, 33y are spread with a complex, pseudo-noise (pn) sequence 35I, 35Q using a complex number multiplier 39. The operation of a complex number multiplier 39 is shown in FIG. 2B and is well understood in the art. The spreading operation can be represented as:

$$(x+jy) \times (I+jQ) = (xI-yQ) + j(xQ+yI) = a+jb. \qquad \text{Equation (1)}$$

A complex number is in the form a+jb, where a and b are real numbers and $j^2=-1$. Referring back to FIG. 2a, the resulting I 37a and Q 37b spread signals are combined 45a, 45b with other spread signals (channels) having different spreading codes, multiplied (mixed) with a carrier signal 43, and transmitted 47. The transmission 47 may contain a plurality of individual signals.

The receiver 21 includes a demodulator 49a, 49b which mixes down the transmitted broadband signal 47 with the transmitting carrier 43 into an intermediate carrier frequency 51a, 51b. A second down conversion reduces the signal to baseband. The QPSK signal 55a, 55b is then filtered 53 and mixed 56 with the locally generated complex pn sequence 35I, 35Q which matches the conjugate of the transmitted complex code. Only the original signals which were spread by the same code will be despread. All other signals will appear as noise to the receiver 21. The data 57x, 57y is coupled to a signal processor 59 where FEC decoding is performed on the convolutionally encoded data.

Figure 3A:
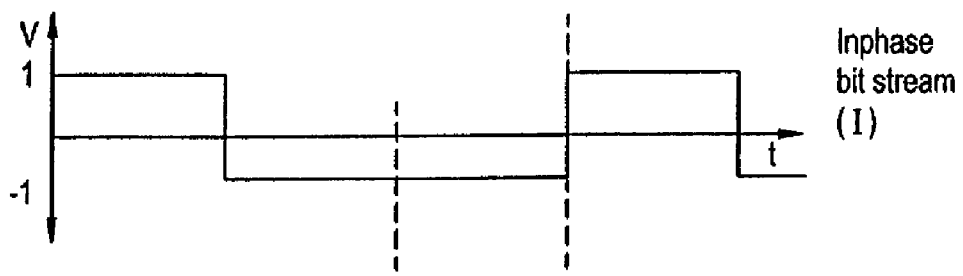
FIG. 3A is a plot of an in-phase bit stream.
Figure 3B:
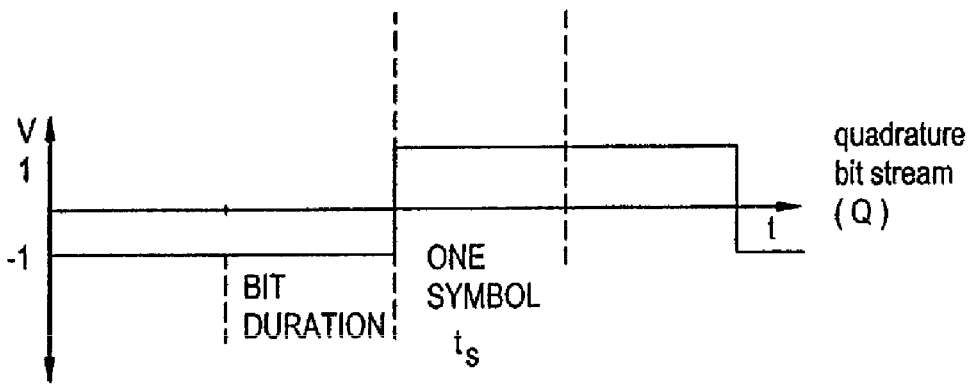
FIG. 3B is a plot of a quadrature bit stream.

As shown in FIGS. 3A and 3B, a QPSK symbol consists of one bit each from both the in-phase (I) and quadrature (Q) signals. The bits may represent a quantized version of an analog sample or digital data. It can be seen that symbol duration $t_s$ is equal to bit duration.

Figure 3C:
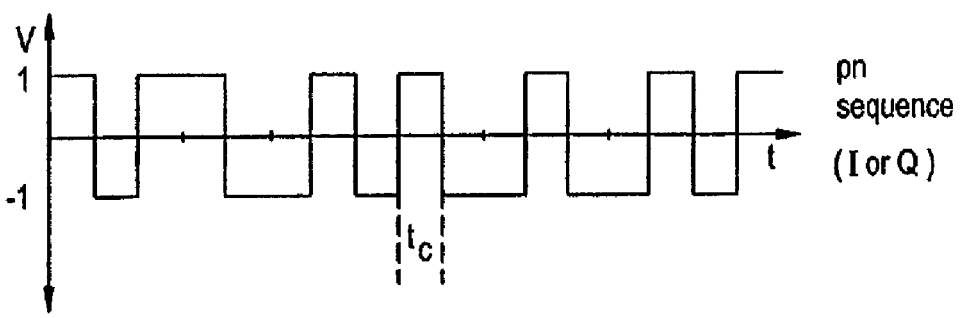
FIG. 3C is a plot of a pseudo-noise (pn) bit sequence.

The transmitted symbols are spread by multiplying the QPSK symbol stream by the complex pn sequence. Both the I and Q pn sequences are comprised of a bit stream generated at a much higher frequency, typically 100 to 200 times the symbol rate. One such pn sequence is shown in FIG. 3C. The complex pn sequence is mixed with the symbol bit stream producing the digital spread signal (as previously discussed). The components of the spread signal are known as chips having a much smaller duration $t_c$.

When the signal is received and demodulated, the baseband signal is at the chip level. When the I and Q components of the signal are despread using the conjugate of the pn sequence used during spreading, the signal returns to the symbol level.

Figure 5:
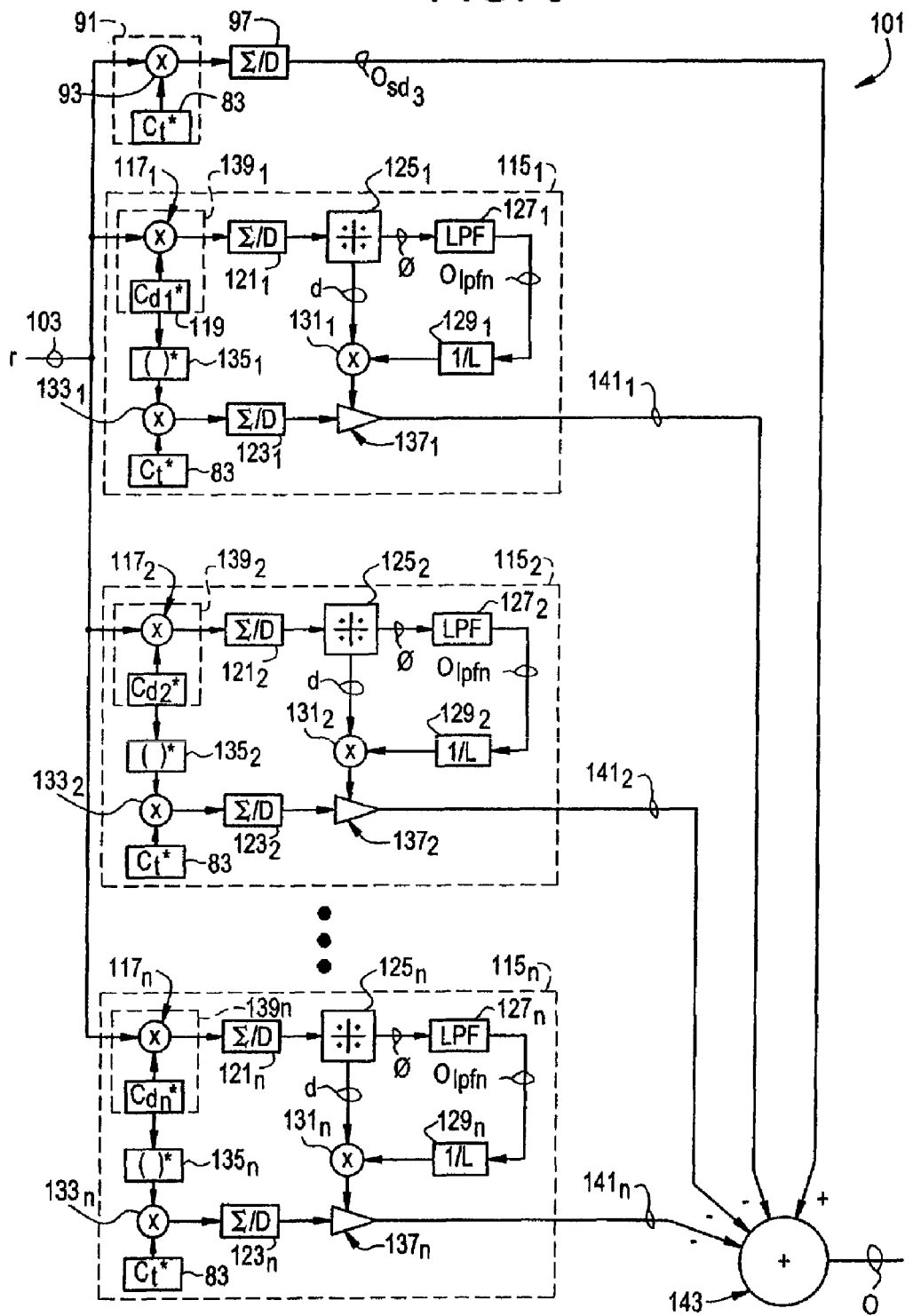
FIG. 5 is a block diagram of an unwanted traffic signal(s) cancellation system according to the present invention.
Figure 7:
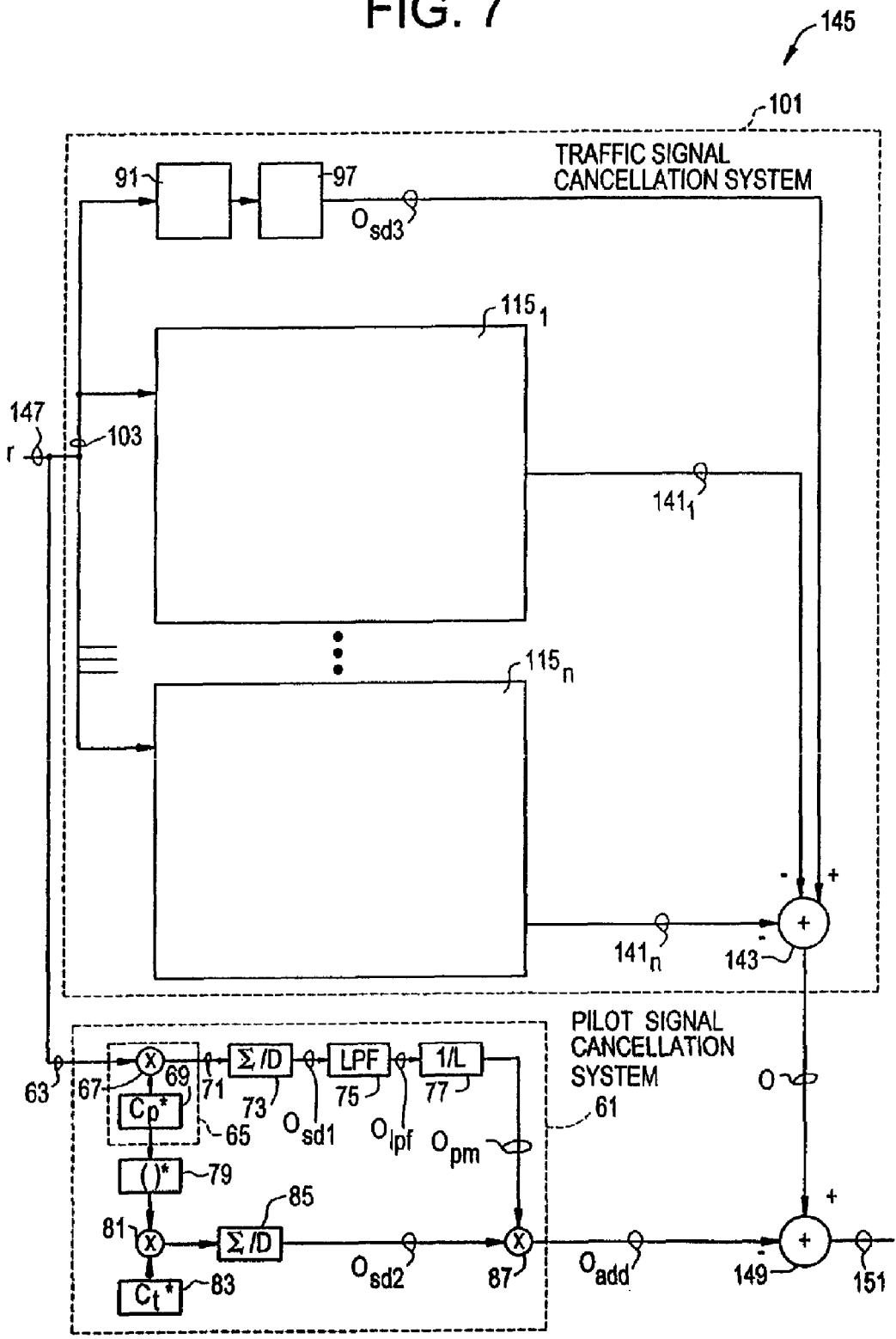
FIG. 7 is a block diagram of a combined pilot and unwanted traffic signal cancellation system according to the present invention.

The embodiments of the present invention are shown in FIGS. 4, 5 and 7. The global pilot signal cancellation system 61 embodiment is shown in FIG. 4. A received signal r is expressed as:

$$r = \alpha c_p + \beta c_t + n \qquad \text{Equation (2)}$$

where the received signal r is a complex number and is comprised of the pilot strength $\alpha$ multiplied with the pilot code $c_p$, summed with the traffic strength $\beta$ multiplied with the traffic code $c_t$, summed with random noise n. The noise n includes all received noise and interference including all other traffic signals. To cancel the global pilot signal from the received signal r, the system 61 must derive the signal strength of the pilot code $\alpha$ where:

$$\alpha \neq \beta \qquad \text{Equation (3)}$$

since the global pilot is transmitted at a higher power level than a traffic signal.

When the received signal r is summed over time, Equation (2) becomes:

$$\Sigma r = \alpha \Sigma c_p + \beta \Sigma c_t + \Sigma n. \qquad \text{(Equation 4)}$$

Referring to FIG. 4, the received baseband signal r is input 63 into the pilot signal cancellation system 61 and into a pilot despreader 65 which despreads the pilot signal from the received signal r. First mixer 67 despreads the received signal r by multiplying with the complex conjugate $c_p^*$ 69 of the pilot pn code used during spreading yielding:

$$\Sigma rc^*_p = \alpha c_p c^*_p + \beta \Sigma c_t c^*_p + \Sigma nc^*_p. \qquad \text{Equation (5)}$$

A complex conjugate is one of a pair of complex numbers with identical real parts and with imaginary parts differing only in sign.

The despread pilot signal 71 is coupled to a first sum and dump processor 73 where it is summed over time. The first sum and dump 73 output $O_{sd1}$ is:

$$O_{sd1} = \alpha L + \beta \Sigma c_t c^*_p + \Sigma nc^*_p \qquad \text{Equation (6)}$$

where L is the product of the pilot spreading code $c_p$ and the complex conjugate of the pilot spreading code $c_p^*$ summed over L chips.

The sum and dump 73 output $O_{sd1}$ is coupled to a low pass filter 75. The low pass filter 75 determines the mean value for each signal component. The mean value for pilot-traffic cross-correlation is zero and so is the mean value of the noise n. Therefore, after filtering 75, the second and third terms in Equation (6) become zero. The low pass filter 75 output $O_{lpf}$ over time is:

$$O_{lbf} = \alpha L \qquad \text{Equation (7)}$$

The low pass filter 75 output $O_{lpf}$ is coupled to a processing means 77 to derive the pilot code strength $\alpha$. The processing means 77 calculates $\alpha$ by dividing the low pass filter 79 output $O_{lpf}$ by L. Thus, the processing means 77 output $O_{pm}$ is:

$$O_{pm} = \alpha. \qquad \text{Equation (8)}$$

The pilot spreading code $c_p^*$ complex conjugate generator 69 is coupled to a complex conjugate processor 79 yielding the pilot spreading code $c_p$. The pilot spreading code $c_p$ is input to a second mixer 81 and mixed with the output of a traffic spreading code $c_t^*$ complex conjugate generator 83. The resulting product from the second mixer 81 output is coupled to a second sum and dump processor 85. The output $O_{sd2}$ of the second sum and dump processor 85 is $\Gamma c_p c_t^*$ and is combined with at a third mixer 87. The third mixer 87 output 89 is $\alpha \Gamma c_p c_t^*$.

The received signal r is also despread by traffic despreader 91. The traffic despreader 91 despreads the received signal r by mixing the received signal r with the traffic code $c_t^*$ complex conjugate generator 83 using a fourth mixer 93 yielding:

$$\Sigma rc^*_t = \alpha \Sigma c_p c^*_t + \beta \Sigma c_t c^*_t + \Sigma nc^*_t. \qquad \text{Equation (9)}$$

The traffic despreader 91 output 95 is coupled to a third sum and dump 97. The third sum and dump 97 output $O_{sd3}$ over time is:

$$O_{sd3} = \Sigma rc_t = \beta L + \alpha \Sigma c_p c^*_t + \Sigma nc^*_t \qquad \text{Equation (10)}$$

where L is the product of the traffic spreading code $c_t$ and the complex conjugate of the traffic spreading code $c_t^*$ summed over L chips.

The third sum and dump 97 output $O_{sd3}$ is coupled to an adder 99 which subtracts the third mixer 87 output 89. The adder 99 output $O_{add}$ is:

$$O_{add} = \beta L + \alpha \Sigma c_p c^*_t + \Sigma nc^*_t - \alpha \Sigma c_p c^*_t \qquad \text{Equation (11)}$$

Thus, the pilot canceller 61 output $O_{add}$ is equal to the received signal r minus the pilot signal simplified below:

$$O_{add} = \beta L + \Sigma nd^*_t. \qquad \text{Equation (12)}$$

The invention uses a similar approach to cancel unwanted traffic signal(s) from a desired traffic signal. While traffic signals are interference to other traffic signals just as the global pilot signal is, unwanted traffic signal cancellation differs from global pilot signal cancellation since a traffic signal is modulated by the data and is therefore dynamic in nature. A global pilot signal has a constant phase, whereas a traffic signal constantly changes phase due to data modulation.

The traffic signal canceller system 101 embodiment is shown in FIG. 5. As above, a received signal r is input 103 to the system:

$$r = \psi dc_d + \beta c_t + n \qquad \text{Equation (13)}$$

where the received signal r is a complex number and is comprised of the traffic code signal strength $\Theta$ multiplied with the traffic signal data d and the traffic code $c_d$ for the unwanted traffic signal to be canceled, summed with the desired traffic code strength $\beta$ multiplied with the desired traffic code $c_t$, summed with noise n. The noise n includes all received noise and interference including all other traffic signals and the global pilot signal. To cancel the unwanted traffic signal(s) from the received signal r, the system 101 must derive the signal strength of the unwanted traffic code $\Theta$ to be subtracted and estimate the data d, where:

$$\psi \neq d \neq \beta. \qquad \text{Equation (14)}$$

When the received signal r is summed over time, Equation 13 can be expressed as:

$$\Sigma r = \psi d \Sigma c_d + \beta \Sigma c_t + \Sigma n. \qquad \text{Equation (15)}$$

Referring to FIG. 5, the received baseband signal r is input 103 into the desired traffic signal despreader 91 which despreads the desired traffic signal from the received signal r. Desired traffic signal mixer 93 mixes the received signal r with the complex conjugate $c_t^*$ of the desired traffic pn code used during spreading. The despread traffic signal is coupled to a sum and dump processor 97 and summed over time. The sum and dump 97 output $O_{sd3}$ is:

$$O_{sd3} = \Sigma rc^*_t = \beta L + \psi d \Sigma c_d c^*_t + \Sigma nc^*_t. \qquad \text{Equation (16)}$$

The traffic signal canceller system 101 shown in FIG. 5 includes n unwanted traffic signal cancellers $115_1$-$115_n$. An exemplary embodiment includes 10 (where n=10) unwanted traffic signal cancellers $115_1$-$115_{10}$.

Each unwanted traffic signal canceller $115_1$-$115_n$ comprises: an unwanted traffic signal despreader $139_1$-$139_n$ that includes a first mixer $117_1$-$117_n$ and an unwanted traffic signal code generator $119_1$-$119_n$; second $133_1$-$133_n$ mixer, first $121_1$-$121_n$ and second $123_1$-$123_n$ sum and dump processors, a hard decision processor $125_1$-$125_n$, a low pass filter $127_1$-$127_n$, a processing means $129_1$-$129_n$, third mixer $131_1$-$131_n$, a conjugate processor $135_1$-$135_n$, an adjustable amplifier $137_1$-$137_n$, and a desired traffic signal code generator 83.

As above, the received signal r is input 103 into each unwanted traffic canceller $115_1$-$115_n$. The unwanted traffic signal despreader $139_1$-$139_n$ is coupled to the input 103 where the received signal r is mixed $117_1$-$117_n$ with the complex conjugate $c_{d1}^*$-$c_{dn}^*$ of the traffic pn sequence for each respective unwanted signal. The despread $139_1$-$139_n$ traffic signal is coupled to a first sum and dump processor $121_1$-$121_n$ where it is summed over time. The first sum and dump $121_1$-$121_n$ output $O_{sd1n}$ is:

$$O_{sd1n} = \Sigma r c_{dn}^* = \psi dL + \beta \Sigma c_t c_{dn}^* + \Sigma n c_{dn}^*. \quad \text{Equation (17)}$$

where L is the product of the unwanted traffic signal spreading code $c_{dn}$ and $c_{dn}^*$ is the complex conjugate of the unwanted traffic signal spreading code.

The first sum and dump $121_1$-$121_n$ output $O_{sd1n}$ is coupled to the hard decision processor $125_1$-$125_n$. The hard decision processor $125_1$-$125_n$ determines the phase shift Ø in the data due to modulation. The hard decision processor $125_1$-$125_n$ also determines the QPSK constellation position d that is closest to the despread symbol value.

Figure 6:
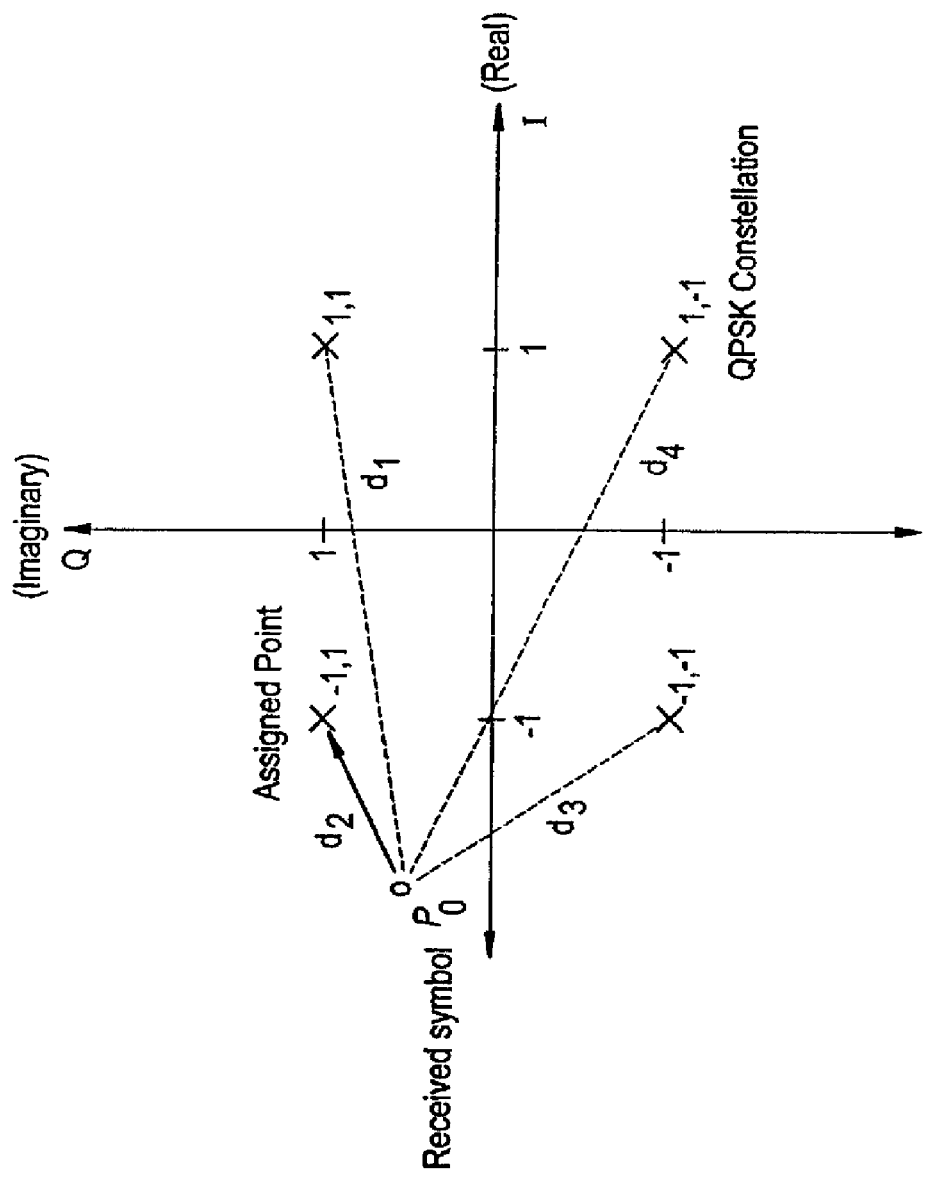
FIG. 6 is a diagram of a received symbol $p_o$ on the QPSK constellation showing a hard decision.

As shown in FIG. 6, the hard decision processor $125_1$-$125_n$ compares a received symbol $p_o$ of a signal to the four QPSK constellation points $x_{1,1}, x_{-1,1}, x_{-1,-1}, x_{1,-1}$. It is necessary to examine each received symbol $p_o$ due to corruption during transmission 47 by noise and distortion, whether multipath or radio frequency. The hard decision processor computes the four distances $d_1, d_2, d_3, d_4$ to each quadrant from the received symbol $p_o$ and chooses the shortest distance $d_2$ and assigns that symbol d location $x_{-1,1}$. The hard decision processor also derotates (rotates back) the original signal coordinate $p_o$ by a phase amount Ø that is equal to the phase corresponding to the selected symbol location $x_{-1,1}$. The original symbol coordinate $p_o$ is discarded.

The hard decision processor $125_1$-$125_n$ phase output Ø is coupled to a low pass filter $127_1$-$127_n$. Over time, the low pass filter $127_1$-$127_n$ determines the mean value for each signal component. The mean value of the traffic-to-traffic cross-correlation and also the mean value of the noise n are zero. Therefore, the low pass filter $127_1$-$127_n$ output $O_{lpfn}$ over time is:

$$O_{lpfn} = \psi L. \quad \text{Equation (18)}$$

The low pass filter $127_1$-$127_n$ output $O_{lpfn}$ is coupled to the processing means $129_1$-$129_n$ to derive the unwanted traffic signal code strength Θ. The processing means $129_1$-$129_n$ estimates Ø by dividing the filter $127_1$-$127_n$ output $O_{lpfn}$ by L.

The other hard decision processor $125_1$-$125_n$ output is data d. This is the data point d corresponding to the smallest of the distances $d_1, d_2, d_3$, or $d_4$ as shown in FIG. 6. Third mixer $131_1$-$131_n$ mixes the unwanted traffic signal strength Θ with each data value d.

The unwanted traffic signal spreading code complex conjugate generator $c_{d1}^*$-$c_{dn}^*$ is coupled to the complex conjugate processor $135_1$-$135_n$ yielding the unwanted traffic signal spreading code $c_{d1}$-$c_{dn}$ and is input to the second mixer $133_1$-$133_n$ and mixed with the output of desired traffic signal spreading code complex conjugate generator $c_t^*$. The product is coupled to the second sum and dump processor $123_1$-$123_n$. The second sum and dump processor $123_1$-$123_n$ output $O_{sd2n}$ is $\Gamma c d_n c_t^*$ and is coupled to variable amplifier $137_1$-$137_n$. Variable amplifier $137_1$-$137_n$ amplifies the second sum and dump processor $123_1$-$123_n$ output $O_{sd2n}$ in accordance with the third mixer $131_1$-$131_n$ output which is the determined gain.

The variable amplifier $137_1$-$137_n$ output $141_1$-$141_n$ is coupled to an adder 143 which subtracts the output from each variable amplifier $137_1$-$137_n$ from the output of the desired traffic signal despreader 115. The output O is:

$$O = \beta L + \psi d \Sigma c_d c^*_t + \Sigma n c^*_t - \psi d \Sigma c_d c^*_t. \quad \text{Equation (19)}$$

The adder 143 output O (also the unwanted traffic canceller system 101 output) is equal to the received signal r minus the unwanted traffic signals simplified below:

$$O = \beta L + \Sigma n c^*_t \quad \text{Equation (20)}$$

where the noise n varies depending on the amount of traffic signals subtracted from the received signal.

Another embodiment 145 canceling the global pilot signal and unwanted traffic signals is shown in FIG. 7. As previously discussed, the unwanted traffic cancellation system 101 includes the desired traffic signal despreader 91 and a plurality of unwanted traffic signal cancellers $115_1$-$115_n$. The traffic cancellation system is coupled in parallel with the pilot cancellation system 61 previously described, but without a desired traffic signal despreader. A common input 147 is coupled to both systems 101, 61 with a common adder 149 which is coupled to the outputs O, $O_{add}$ from both systems 101, 61. The pilot and unwanted traffic signals are subtracted from the desired traffic signal yielding an output 151 free of interference contributions by the pilot and plurality of transmitted traffic signals.

While specific embodiments of the present invention have been shown and described, many modifications and variations could be made by one skilled in the art without departing from the spirit and scope of the invention. The above description serves to illustrate and not limit the particular form in any way.

What is claimed is:

1. A method for removing a selected signal from a received signal, the method comprising:
   receiving code division multiple access (CDMA) signals including a first signal and a second signal, the first signal being spread with a first spreading code and the second signal being spread with a second spreading code;
   despreading the received CDMA signals with a complex conjugate of the first spreading code to generate a first de-spread signal;
   despreading the received CDMA signals with a complex conjugate of the second spreading code to generate a second de-spread signal;
   generating a symbol value based on the second de-spread signal;
   generating a second signal strength based on the second de-spread signal;
   calculating a correlation of the second spreading code and a complex conjugate of the first spreading code;
   generating a cancellation signal component based on the correlation, the second signal strength, and the symbol value; and subtracting the cancellation signal component from the first de-spread signal.

2. The method of claim 1 wherein the second signal strength is generated by:
generating a phase error between the symbol value and the second de-spread signal in a constellation;
derotating the second de-spread signal by the phase error;
low-pass-filtering the derotated second de-spread signal; and
dividing a low-pass-filtered value by a product of the second spreading code and the complex conjugate of the second spreading code.

3. The method of claim 1 further comprising:
despreading the received CDMA signals with a complex conjugate of a pilot spreading code to generate a third de-spread signal;
generating a pilot signal strength based on the third de-spread signal;
calculating a second correlation of the pilot spreading code and a complex conjugate of the first spreading code;
generating a second cancellation signal component based on the second correlation and the pilot signal strength; and
subtracting the second cancellation signal component from the first de-spread signal.

4. The method of claim 3 wherein the pilot signal strength is generated by:
low-pass-filtering the third de-spread signal; and
dividing the low-pass-filtered third de-spread signal with a product of the pilot spreading code and a complex conjugate of the first spreading code.

5. A method for removing the pilot signal from a received signal, the method comprising:
receiving code division multiple access (CDMA) signals including a first signal and a pilot signal, the first signal being spread with a first spreading code and the pilot signal being spread with a pilot spreading code;
despreading the received CDMA signals with a complex conjugate of the first spreading code to generate a first de-spread signal;
despreading the received CDMA signals with a complex conjugate of the pilot spreading code to generate a second de-spread signal;
generating a pilot signal strength based on the second de-spread signal;
calculating a correlation of the pilot spreading code and a complex conjugate of the first spreading code;
generating a pilot cancellation signal component based on the correlation and the pilot signal strength; and
subtracting the pilot cancellation signal component from the first de-spread signal.

6. The method of claim 5 wherein the pilot signal strength is generated by:
low-pass-filtering the second de-spread signal; and
dividing the low-pass-filtered second de-spread signal with a product of the pilot spreading code and a complex conjugate of the first spreading code.

7. An apparatus configured to remove a selected signal from a received signal, the apparatus comprising:
a receiver for receiving code division multiple access (CDMA) signals including a first signal and a second signal, the first signal being spread with a first spreading code and the second signal being spread with a second spreading code;
a first despreader for despreading the received CDMA signals with a complex conjugate of the first spreading code to generate a first de-spread signal;
a second despreader for despreading the received CDMA signals with a complex conjugate of the second spreading code to generate a second de-spread signal;
a hard decision processor for generating a symbol value based on the second de-spread signal;
a signal strength generation device for generating a second signal strength based on the second de-spread signal;
a correlator for calculating a correlation of the second spreading code and a complex conjugate of the first spreading code;
a cancellation signal generation device for generating a cancellation signal component based on the correlation, the second signal strength, and the symbol value; and
a subtractor for subtracting the cancellation signal component from the first de-spread signal.

8. The apparatus of claim 7 wherein the signal strength generation device comprises:
a hard decision processor for generating a phase error between the symbol value and the second de-spread signal in a constellation, and derotating the second de-spread signal by the phase error;
a low-pass filter for low-pass-filtering the derotated second de-spread signal; and
a divider for dividing an output from the low-pass-filter by a product of the second spreading code and the complex conjugate of the second spreading code.

9. The apparatus of claim 7 further comprising:
a third despreader for despreading the received CDMA signals with a complex conjugate of a pilot spreading code to generate a third de-spread signal;
a pilot signal strength generator for generating a pilot signal strength based on the third de-spread signal;
a second correlator for calculating a second correlation of the pilot spreading code and a complex conjugate of the first spreading code; and
a second cancellation signal generator for generating a second cancellation signal component based on the second correlation and the pilot signal strength, wherein the subtractor subtracts the second cancellation signal component from the first de-spread signal.

10. The apparatus of claim 9 wherein the pilot signal strength generator comprises:
a low-pass filter for low-pass-filtering the third de-spread signal; and
a divider for dividing an output from the low-pass-filter with a product of the pilot spreading code and a complex conjugate of the first spreading code.

11. An apparatus for removing the pilot signal from a received signal, the method comprising:
a receiver for receiving code division multiple access (CDMA) signals including a first signal and a pilot signal, the first signal being spread with a first spreading code and the pilot signal being spread with a pilot spreading code;
a first despreader for despreading the received CDMA signals with a complex conjugate of the first spreading code to generate a first de-spread signal;
a second despreader for despreading the received CDMA signals with a complex conjugate of the pilot spreading code to generate a second de-spread signal;
a pilot signal strength generator for generating a pilot signal strength based on the second de-spread signal;

a correlator for calculating a correlation of the pilot spreading code and a complex conjugate of the first spreading code;
a cancellation signal generator for generating a pilot cancellation signal component based on the correlation and the pilot signal strength; and
a subtractor for subtracting the pilot cancellation signal component from the first de-spread signal.

12. The apparatus of claim 11 wherein the pilot signal strength generator comprises:
a low-pass filter for low-pass-filtering the second de-spread signal; and a divider for dividing an output from the low-pass-filter with a product of the pilot spreading code and a complex conjugate of the first spreading code.

* * * * *